COLOR TELEVISION DEGAUSSING APPARATUS

Filed April 30, 1964

INVENTORS:
Harold F. Rieth
George O'Leary
By Smyth, Roston & Pavitt
Attorneys

INVENTORS:
Harold F. Rieth
George O'Leary
By Smyth, Roston & Pavitt
Attorneys

COLOR TELEVISION DEGAUSSING APPARATUS

Filed April 30, 1964

INVENTORS:
Harold F. Rieth
George O'Leary
By Smyth, Roston & Pavitt
Attorneys

United States Patent Office 3,340,443

Patented Sept. 5, 1967

3,340,443

COLOR TELEVISION DEGAUSSING APPARATUS

Harold F. Rieth and George O'Leary, Santa Monica, Calif., assignors to Packard-Bell Electronics Corporation, Los Angeles, Calif., a corporation of California Filed Apr. 30, 1964, Ser. No. 363,940
11 Claims. (Cl. 317—157.5)

ABSTRACT OF THE DISCLOSURE

This invention relates to a system for degaussing a color television receiver to insure that the television tube in the television receiver displays proper colors. The invention includes a pair of coils positioned adjacent the mask of the tube at spaced positions and extending in a direction transverse to the mask to produce magnetic flux in the mask without any dead spot at any position on the face of the color televison tube. The invention further includes a switch which extends to a position external to the cabinet of the television receiver to obtain the degaussing action when the switch is actuated. The actuation of the switch causes a circuit including the switch and the pair of coils to produce an alternating current of decaying characteristics through the coils for obtaining the degaussing action.

The present invention relates to color television receivers and more particularly to means for degaussing picture tubes in color television receivers.

In color television receivers presently available, the display face of the picture tube is coated with phosphors that luminesce with visible light of different colors when bombarded with electrons. The phosphors are arranged in clusters with each cluster including three separate portions which luminesces with the three primary colors. Three electron guns or a separate electron gun for each primary color gun is provided to scan the phosphors and excite them into luminescence with visible colored light whereby a colored picture is produced. In order to maintain a separation of the colors, it is essential that the electrons from a particular gun strike only those electrons associated with that gun. One means for facilitating a separation of the clusters and preventing them striking the wrong electrons is to employ a shadow mask between the electron guns and the phosphors.

The shadow mask includes a separate aperture for each cluster. Each of the apertures is respectively aligned with the three different portions of the clusters and the three electron guns. The electrons from any electron gun will be free to strike only the portions of the clusters containing the phosphors that luminesce with the primary color corresponding to the gun. All of the remaining portions of the clusters will be in a "shadow" of the mask and electrons from the gun will be unable to strike the remaining portions. As a result, a complete separation of the colors is maintained even though the electrons are not precisely aimed at only a particular phosphor.

The efficiency with which the shadow mask shields the various portions of the clusters is dependent upon each of the electrons travelling in a straight line from the deflection system to the displace face. In the event an electron beam is deflected from a straight line and travels on a curved path, it becomes possible for electrons to strike and excite phosphors of the wrong color. Such a malfunctioning of the mask will result in the video display being improperly colored.

Electrons are readily deflected by magnetic flux fields and even very small magnetic fields in or around the shadow mask will distort the electron beam by a sufficient amount to reduce the color separation. If the mask were fabricated from non-magnetic materials, it would be impossible for the mask to acquire a permanent magnetization. However, for various reasons, it has been found that the material best suited for use as a mask is stainless steel. Although stainless steels are normally considered nonmagnetic, they do possess magnetic properties. As a consequence, it is possible for certain amounts of residual magnetism to remain in the mask. One of the most common sources of residual magnetism in the shadow mask is the earth's magnetic field. If a color television receiver is moved even a small distance, the various flux lines in the earth's field cut across the mask and magnetize one or more portions of the mask to a sufficient degree to distort the colors in the display. To avoid this effect, it has been necessary to retain the color television receiver in a fixed position at all times.

Once the mask becomes magnetized, it is necessary to degauss the mask to remove all of the permanent magnetism therein. Heretofore, degaussing of the mask has been accomplished by placing a degaussing coil adjacent to the face of the picture tube. The coil is then energized with an alternating current that will produce an alternating flux field in the mask. While the coil is maintained energized, it is gradually withdraw from the face of the tube whereby the intensity of the field in the mask is gradually reduced. During each succeeding cycle of the flux field, the intensity is slightly less than during the preceding cycle. As a consequence, the residual or permanent magnetism in the mask is reduced to within an acceptable limit.

The foregoing method has been effective to remove residual magnetism in the mask. However, special equipment such as a degaussing coil and a suitable power supply is required. Also a certain amount of skill is required to operate the equipment as it is necessary to move the coil in a particular pattern as it is gradually withdrawn from the receiver. Such equipment and skill is not readily available to the average viewer. As a result, each time that the shadow mask becomes magnetized, such as by being moved, it is necessary to have a television repairman make a service call to degauss the picture tube. Such service calls are expensive and inconvenient. As a result, heretofore, it has been necessary to retain color television receivers in fixed positions and the making of portable receivers has been precluded.

Thep resent invention provides means for overcoming the foregoing difficulties. More particularly, the present invention provides means which are especially adapted to be incorporated into a color television receiver for insuring a maximum amount of separation between the colors in the colored display. In addition, means are provided that will permit the use of portable color television receivers or permit conventional color television receivers to be moved without altering the quality of the colored video display. This is accomplished by providing means that may be permanently mounted on a television receiver to maintain proper alignment between the electron guns and the various phosphors on the face of the picture tube even though the receiver moves relative to a very strong magnetic field. Degaussing means are provided on the picture tube and are interconnected with the rest of the receiver to degauss the shadow mask in the picture tube to maintain it free of any permanent magnetization and to eliminate the necessity of a television repairman making a service call to degauss the picture tube.

An inductance or coil is permanently mounted on the television receiver adjacent to the picture tube. When a current circulates through the coil, a magnetic flux field extends into and through the mask. A current source is also provided for being interconnected with the coil and circulating an alternating current through the coil whereby the flux field in the mask will have an alternating polarity. The current source is effective to gradually reduce the amount of current between the successive cycles whereby the flux density in the mask will be gradually reduced to zero. This will be effective to completely degauss the mask in the picture tube and eliminate any degradation of the color separation due to movement of the television receiver or magnetization of the mask.

In one particular embodiment of the present invention, the current source includes a condenser which may be interconnected with the coil to form a resonant tank circuit having a predetermined resonant frequency. The condenser is normally maintained isolated from the coil and charged to a predetermined level. At the instant the picture tube is to be degaussed, the charged condenser is interconnected with the coil. The condenser discharges into the coil and produces a large surge of current in the coil and flux field in the mask. This surge of current oscillates back and forth between the coil and condenser while it exponentially decays to zero. As a result, the high frequency magnetic field in the mask decays and the mask is completely degaussed. The present invention thereby makes it possible to degauss the mask in a color picture tube without requiring a service call from a repairman and makes it possible to move a color television receiver when ever desired.

These and other features and advantages of the present invention will become readily apparent from the following detailed description of a limited number of embodiments thereof particularly when taken in connection with the accompanying drawing wherein like reference numerals refer to like parts and wherein:

FIGURE 1 is a cross-sectional view through a portion of a color television receiver employing a degaussing system embodying one form of the present invention;

FIGURE 1*a* is a fragmentary perspective view on a large scale of a portion of the picture tube in the television receiver of FIGURE 1;

Figure 1:
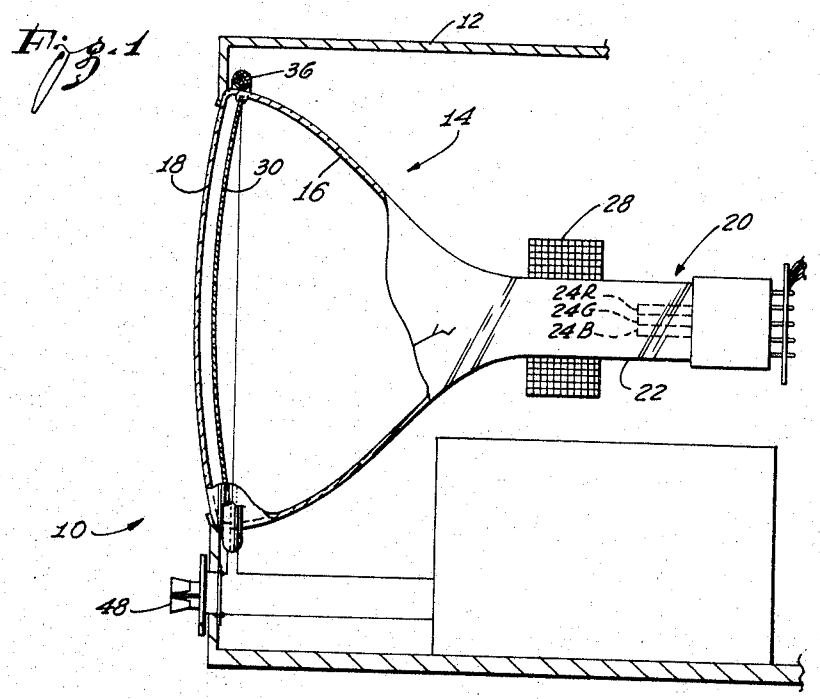

Referring to the drawings in more detail, the present invention is particularly adapted to be embodied in a color television receiver 10 enclosed in a protective housing or cabinet 12 that conceals various portions of the receiver 10. The present receiver 10 employs a single cathode ray tube 14 having an envelope 16 with a display face 18 on one end thereof. The display face 18 is effective to produce a colored video display. The tube 14 is mounted so that the display face 18 is positioned in an opening in the front of the cabinet 12 so as to be visible to a viewer The display face 18 is a glass member transparent to visible light. The surface on the inside of the face 18 is coated with a plurality of phosphors that luminesce or glow with visible light when excited by high velocity electrons. The visible light produced by the phosphors will travel through the face and produce a luminescent color video display. The phosphors are divided into three different groups with the phosphors in each group being effective to luminesce with only a single primary color. In the present color television system, the primary colors are red, green and blue.

Figures 1A, 2, 11:
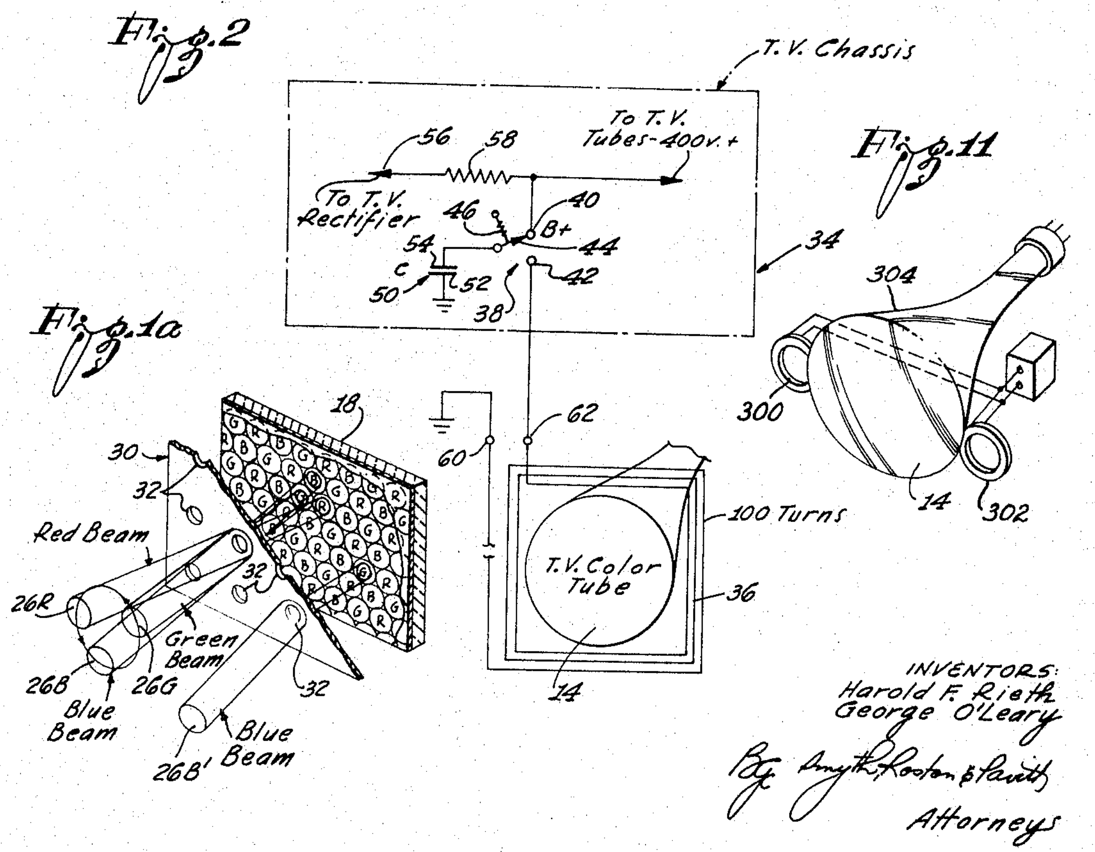
FIGURE 2 is a schematic wiring diagram of the degaussing system of FIGURE 1.
FIGURE 11 is a perspective view illustrating another embodiment of the invention.

As best seen in FIGURE 1*a*, the phosphors may also be considered as being divided into a large number of separate clusters regularly spaced across the display face. These clusters are substantially identical to each other and include a separate portion for each of the groups of phosphors. Each portion is in the form of a dot and includes only the phosphors from one of the primary groups.

Each cluster includes a red dot R that will luminesce with only red light, a green dot G which will luminesce only with green light and a blue dot B which will luminesce with only blue light. As a result, each cluster will be capable of luminescing with red, green or blue light or any combination of these colors depending upon which portion or portions of the cluster is excited into luminescence by impinging electrons.

In order to excite the various phosphors into luminescence, suitable electron means 20 are provided inside of the envelope 16. The electron means are disposed in a reduced end or neck 22 of the tube 14 most remote from the display face 18. The electron means 20 are effective to accelerate and direct electrons axially of the tube 14 towards and against the display face 18 with sufficient velocity to excite the various phosphors into luminescence.

In the present cathode ray tube 14, the electron means 20 includes a separate electron gun 24R, 24G and 24B for each of the primary colors. Each of the electron guns 24 includes its own cathode for generating its own free electrons. In addition, means are provided in each gun to accelerate and focus the free electrons into well defined high velocity beams. The three guns 24R, 24G and 24B provide three separate beams 26R, 26G and 26B which, as best seen in FIGURE 1*a*, may be identified as the red beam, green beam and blue beam.

Deflection means are also provided for deflecting the beams 26 vertically and horizontally across the display face 18 and onto any portion of the display face 18. Although any desired type of deflection system may be employed, in the present instance, a single deflection system is provided for all three of the electron beams 26. This deflection system includes an inductance or magnetic yoke 28 which is disposed around the outside of the neck 22 of the envelope 16. When energized, this yoke 28 will produce magnetic flux fields that will simultaneously deflect the electrons in all three beams 26 vertically and horizontally. This will insure all of the beams 26 from being synchronously scanned across the display face 18.

A fine grain, high resolution picture requires the clusters and the phosphor dots therein to be extremely small and very closely spaced. The various electron beams 26 may be sharply focused and very precisely scanned across the display face 18. However, it has been found extremely difficult, if not impossible, to focus the electron beams into a size equal to or less than the size phosphor dots. It has also been impractical to deflect the beams 26 with the required precision to insure the beam striking only those dots which luminesce with the required colors. It will thus be seen that with only the portions of the tube 16 described thus far, there will be a complete failure of color separation and a loss of the color in the picture.

To reduce the precision required in deflecting the electron beams 26 and to insure a separation of the colors, a so-called shadow mask 30 is provided between the electron guns 24 and the display face 18. As best seen in FIGURE 1*a*, this mask 30 includes a separate opening or aperture 32 for each cluster. Each opening 32 is approximately the same size or slightly smaller than the dots. Each opening 32 is disposed adjacent to a cluster and is positioned in direct alignment with the guns 24 of the respective phosphor dots in the cluster.

More particularly, each opening 32 is disposed in direct alignment with the blue phosphor B in its respective cluster and the blue gun 24B. Thus, electrons travelling in a straight line from the blue electron gun 24B may travel through the openings 32 and strike the blue phosphors B. The red and green phosphors R and G in the cluster will be in a "blue shadow" formed by the imperforated portions of the mask 30. Thus, electrons from the blue gun 24B will be blocked from ever striking the red or green phosphors R and G. Similarly, the red dots R and red gun 24R are on a straight line passing through the openings 32 as are the green dots G and green gun 24G. It will thus be seen that irrespective of the precision which the electrons in the various beams 26 are deflected, it will be impossible for the electrons from one gun to strike and excite the phosphors which will produce an undesired color.

A major portion of the electrons in the electron beams 26 are incident on the shadow mask 30. As a result, it is necessary for the mask 30 to be highly, electrically conductive. Electrons captured by the mask 30 will be rapidly dissipated without the mask 30 accumulating a negative charge. There are a large number of electrically conductive materials. However, the mask 30 must be suitable for etching the openings 32 therethrough and must not contaminate the high vacuum required inside of the envelope 16. It has been found that the material best suited for this mask 30 is stainless steel. It should be noted that although many stainless steels are classed as non-magnetic they do, in fact, possess some degree of magnetic properties.

The effectiveness of the shielding provided by the shadow mask 30 is dependent upon the electrons in the various beams 26 travelling in straight lines in the region between the deflection yoke 28 and the display face 18. As long as all of the electrons are travelling in straight lines, a perfect shadow can be provided and a complete separation of the various colors maintained.

If the electrons in one or more of the beams are distorted from a straight line, the electrons may travel along a curved path which will allow the electrons to strike an undesired portion of the cluster. For example, as seen in FIGURE 1*a*, the blue beam 26B′ may be curved or deflected as it passes through the opening 32′ in the shadow mask 30. If this deflection is of sufficient magnitude and direction, the electrons in the blue beam 26B′ will not strike the blue dot B. Instead, they will strike at least a portion of the green dot G. Thus, the blue gun 24B will produce green colors whereby a separation of the colors in the video display will no longer be maintained.

It has been found that one of the most common sources of distortion of the electron beams 26 is the presence of one or more magnetic fields in or around the shadow mask 30. If the mask 30 is made of a completely non-magnetic material, magnetic fields will not concentrate in the region of the mask 30 and the mask 30 will not acquire any permanent magnetism. However, as previously stated, for numerous practical reasons, it is necessary to use a so-called stainless steel material in the mask 30. Although many stainless steels are normally classed as non-magnetic, they do, in fact, possess some magnetic characteristics. As a consequence, it is possible for any of the shadow masks 30 presently employed to become permanently magnetized or have a residual magnetism therein.

It should be noted that although this residual magnetism may be of a very limited quantity, it is possible for the mask 30 to be permanently magnetized to a sufficient magnitude in the region of the openings 32 to deflect at least a portion of the electrons in the beams 26, such as the blue beam 26B′, through a sufficient distance to miss the intended phosphor dot, such as in a blue dot B and strike phosphors, such as in the green dot G, which are intended to be in the shadow of the mask 30.

To maintain a complete separation of the colors in the display, it is highly desirable for the mask 30 to be completely free of any permanent magnetism. Accordingly, in the past, it has been essential that the television receiver 10 remain in a fixed position to avoid the accumulation of any residual magnetism in the mask 30. If the receiver 10 is moved, a substantial number of the flux lines in the earth's magnetic fields will cut across the shadow mask 30. This will produce regions in the mask which are permanently magnetized to a sufficient degree to distort the electron beams 26.

Once the shadow mask 30 does acquire some permanent magnetism, it has been necessary to degauss the shadow mask 30 to restore a complete separation of the colors. Heretofore, this has been accomplished by a television repairman who degaussed the receiver 10 after it has been permanently positioned in its proper location. The television repairman employs a degaussing coil which is energized by a special power supply. The degaussing coil is energized and placed against the face 18 of the picture tube 14. The coil is then gradually withdrawn from the tube 14 while the coil remains energized. In the process of withdrawing the coil, it is necessary to gyrate the coil along a spiral path to insure all regions of the mask being degaussed. This will be effective to gradually reduce the intensity of the field in the mask 30 whereby the magnetization of the mask 30 will gradually be reduced to zero or at least within acceptable limits.

In the present instance, means are provided for maintaining the shadow mask 30 free of any residual or permanent magnetism. This means includes a degaussing system 34 which is permanently mounted on the television receiver 10 and can be operated without any special equipment or any special skills. More particularly, the degaussing system includes an inductance or coil 36 capable of producing a magnetic flux field. Although any desired number of coils may be provided in this embodiment, only one coil is utilized. This coil 36 may include any desired number of turns such as a few hundred turns. When a current flows around the coil 36, a magnetic flux field is radiated from the coil. The flux lines extend through the center of the coil 36 substantially normal to the plane of the coil 36.

The inside diameter of the annulus or coil 36 is sufficiently large to permit the coil 36 to fit over the outside of the tube envelope 16 adjacent the display face 18. Although the shadow mask 30 is generally somewhat spherical and not entirely within a single plane for all practical purposes, the coil 36 may be considered as being positioned coplanar with the mask 30. However, the coil 36 may be disposed in other positions such as at an angle to the mask 30.

The coil 36 is interconnected with means that are capable of energizing the coil 36 by circulating an electrical current therethrough.

The present energizing means includes a current source which is best seen in FIGURE 2. A single pole, double-throw switch 38 having a pair of fixed contacts 40 and 42 and a movable contact 44 is provided for controlling the current source. Spring means 46 are provided to bias the movable contact 44 towards the first fixed contact 40 to thereby normally maintain the contact 44 in the position shown in FIGURE 2.

Means are provided to actuate the switch either manually or automatically to move the movable contact 44 away from the first fixed contact 40 and into electrical engagement with the second fixed contact 42. This may be accomplished automatically, for example, whenever the receiver 10 is turned ON or by means of a control knob 48. Whenever the switch 38 is actuated, the movable contact 44 will only momentarily engage the second contact 42 and the spring 46 will immediately return the movable contact 44 to the first fixed contact 40.

The current source includes a condenser 50 for accumulating and storing an electrical charge having a predetermined amount of energy therein. One side 52 of the condenser 50 is electrically connected directly to ground while the opposite side 54 is electrically connected to the movable contact 44 in the switch 38.

The first fixed contact 40 of the switch 38 is interconected with a source of direct current suitable for transferring an electrical charge into the condenser 50. Although this source may be especially provided for the degaussing system, in the present instance, it includes a section 56 of the standard power supply for rectifying the AC power and providing DC power for operating the various portions of the television receiver 10.

More particularly, the section 56 of the power supply is adapted to provide a direct current at a positive potential on the order of a few hundred volts suitable for energizing the plate circuits of the various tubes in the receiver 10. Normally, this section 56 of the power supply includes a resistor 58 and one or more condensers that filter a pulsating current and remove any ripple therefrom.

The condenser 50 may be especially provided for the degaussing system 34. However, since the movable contact 44 will normally be retained against the first fixed contact 40, the condenser 50 will be electrically connected to the filter line substantially all of the time. Accordingly, if desired, the condenser 50 may be one of the filter condensers normally provided in the power supply.

One side 60 of the coil 36 is connected to ground or directly to side 52 of the condenser 50. The opposite side 62 of the coil 36 is connected to the second fixed contact 42. When the movable contact 44 is positioned as shown in FIGURE 2 (its normal position), the coil 36 will be totally disconnected from all other circuits. Under these circumstances, it is impossible for any current to flow through the coil 36 and the coil 36 is incapable of producing any magnetic flux lines in or around the shadow mask 30. As a consequence, the coil 36 will normally have no effect on the operation of the picture tube 14.

When the movable contact 44 is moved away from the first fixed contact 40 and against the second fixed contact 42, the condenser 50 will be connected directly across the coil 36. The coil 36 and condenser 50 will thereby form a closed loop or a resonant tank circuit. The resonant tank circuit will have a natural frequency at which it will "ring" or oscillate. The frequency of the oscillations is determined by the amount of capacitance in the condenser 50 and the amount of inductance in the coil 36. The capacitance and inductance may be chosen to provide a resonant frequency in any desired range. However, by way of example, the resonant frequency may be in the general range of a few kilocycles.

The only elements in the tank circuit are the condenser 50 and the coil 36. Since these elements have very little resistance, the tank circuit will have a very high Q. Accordingly, when the condenser 50 initially discharges, it will do so very rapidly and produce an initial surge of current having a very large magnitude. By way of example, this initial surge may be on the order up to ten amperes or more. If, as previously mentioned, the coil 36 has a few hundred turns, a magnetomotive force of a few thousand ampere turns will be produced. This will be a sufficiently strong coercive force to produce a large flux field in the mask 30.

As the current from the condenser 50 flows into the coil 36, it will be accumulated in the coil 36 and then returned to the condenser 50. This, in turn, will cause the tank circuit to "ring" or oscillate at the resonant frequency of the circuit. This, in turn, will produce a magnetic field of the same frequency in the shadow mask 50.

As the energy in the stored charge oscillates around the tank circuit, the energy will be gradually dissipated due to various losses. The magnitude of the current will decay exponentially to zero over an interval of time requiring a large number of cycles. The resultant flux density in the mask 30 will be successively reduced between the succeeding cycles down to zero or a very small amount.

During normal operation of the receiver 10, the movable contact 44 in the switch 38 will be spring biased into the position shown in FIGURE 2. This will maintain the condenser 50 connected across the power supply and be fully charged to the potential of the power supply. At the same time, the coil 36 will be completely isolated from all electrical circuits and the coil 36 will produce no flux in the mask 30.

In the event the mask 30 becomes magnetized to a sufficient degree to interfere with the color separation, the viewer may degauss the mask 36 by moving the knob 38 to actuate the switch 44. When the switch 38 is actuated, the movable contact 44 will disengage the first fixed contact 40 and engage the second fixed contact 42. This will connect the condenser 50 directly across the coil 36 and discharge the condenser 50 into the coil 36.

The initial surge of current will produce a heavy flux field around the coil 36 and in the mask 30. Due to the small resistance in the tank circuit and the large number of turns in the coil 36, the initial surge of current may produce a sufficiently strong coercive force to insure the resultant magnetic flux field being in excess of any residual magnetism in the mask 30. In fact, if so desired, the flux field may be sufficiently strong to completely saturate the mask 30.

At the end of the first half cycle, all of the magnetism in the mask 30 will be determined by the ampere turns produced by the current in the coil 36. During the next half cycle, the flux field will be of opposite polarity, but of slightly less amplitude. This will result in a slight decrease in the amount of magnetism in the mask 30. On each succeeding half cycle, the flux field will be reversed and reduced.

If the deterioration of the flux field extends over a sufficient number of cycles, the residual magnetism will be reduced to a zero or at least to a level which will not produce a material deflection of the free electrons. This will restore complete separation of the colors produced by the various electron guns. It will be noted that the degaussing of the shadow mask 30 may be accomplished at any time without any special tools or special equipment and at no cost to the viewer.

Figures 3, 4, 5, 6, 7:
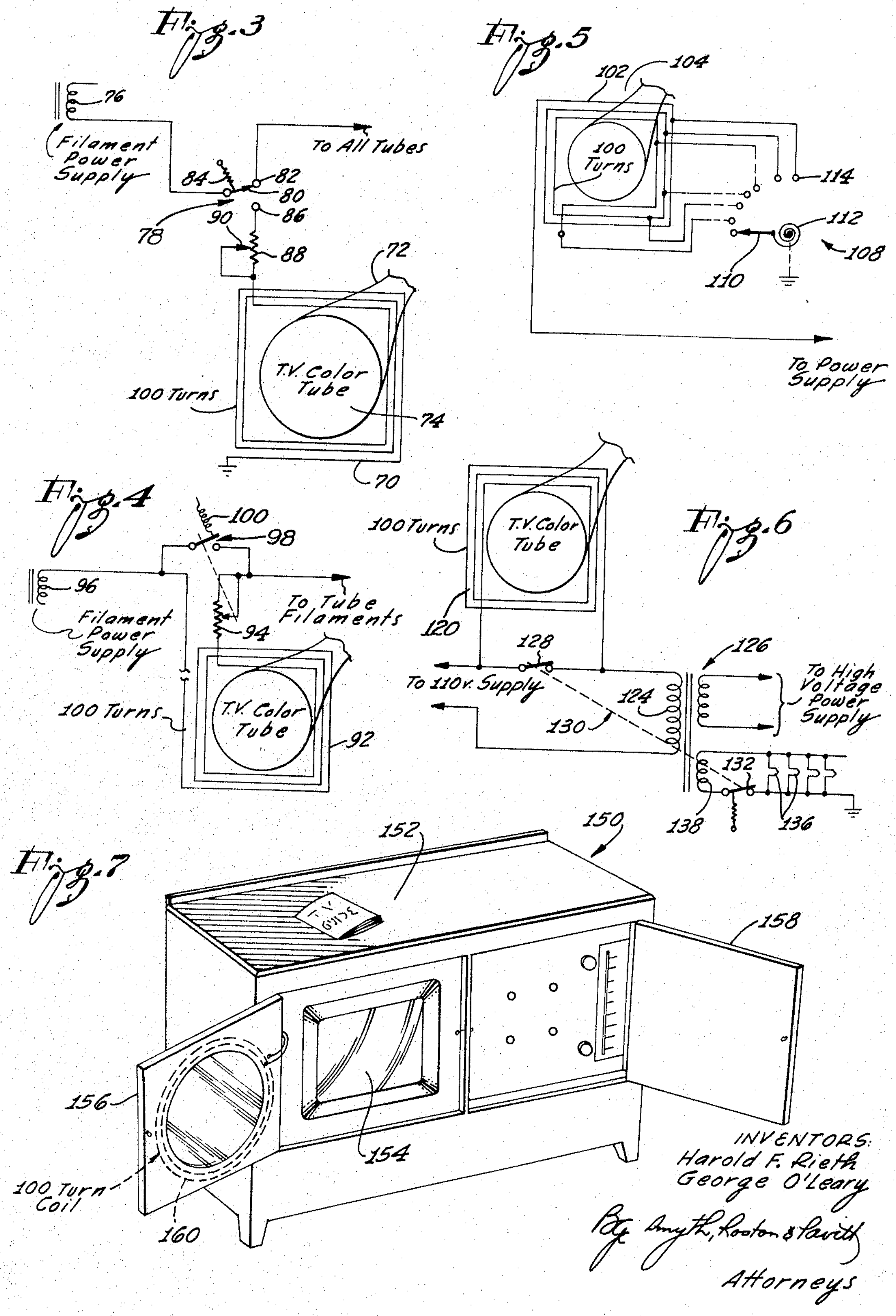
FIGURE 3 is a schematic wiring diagram of a degaussing system embodying another form of the present invention.
FIGURE 4 is a wiring diagram of a degaussing system embodying a further form of the present invention.
FIGURE 5 is a wiring diagram of a degaussing system embodying additional form of the present invention.
FIGURE 6 is a wiring diagram of a degaussing system embodying a further form of the present invention.
FIGURE 7 is a perspective view of a television receiver embodying a degaussing system embodying a further form of the present invention.

As an alternative, the embodiment of FIGURE 3 may be employed. This embodiment is very similar to the preceding embodiment. A degaussing coil 70 is disposed around the exterior of the picture tube 72 in the vicinity of the display face 74 and generally coplanar with the shadow mask.

One side of the coil 70 is electrically connected directly to ground while the opposite side is connected to a source of alternating current. This source of current includes a filament secondary winding 76 in the power transformer. A control switch 78 such as a single throw, double pole switch is provided for interconnecting the secondary winding 76 with the coil 70. The movable contact 80 of the switch 78 is connected directly to the filament secondary winding 76 while the fixed contact 82 is connected to the filaments of the tubes in the receiver. Spring means 84 are provided for normally maintaining the movable contact 80 against the fixed contact 82 whereby the filaments in the various vacuum tubes will be energized.

The second fixed contact 86 is connected to the coil 70 by means of a variable resistor 88. The resistor 88 includes a movable contact 90 that is effective to short out varying portions of the resistance 88 to thereby vary the resistance over an extended range. The movable contact 90 may be interconnected with the movable contact 80 in the switch 78 so as to bias the resistor 88 toward maximum resistance.

During normal viewing, the movable contact 80 will be maintained against the fixed contact 82 and all of the cathodes in the various tubes will be properly heated. In addition, the coil 70 will be isolated from any sources of alternating current and will not effect the operation of the tube 72.

In the event that it is desired to degauss the shadow mask in the picture tube 72, the operator merely manipulates the switch 78 and moves the contact 80 from the fixed contact 82 to the other fixed contact 86. The filaments in the tubes will be isolated from the filament secondary winding 76. to relieve it from an overload. The secondary winding 76 will be connected in series with the degaussing coil 70 and the resistor 88. The movable contact 90 will be positioned to produce a maximum current in the coil 70.

Immediately following actuation of the switch 78, the spring means 84 will cause the movable contact 90 in the variable resistance 88 to sweep across the resistance 88 and increase the resistance in series with the coil 70. This will be effective to reduce the current in the coil 70 and thereby reduce the strength of the magnetic field in the shadow mask.

When the movable contact 90 has moved so as to reduce the current to same predetermined minimum amount, the movable contact 80 in the switch 78 will be moved from the fixed contact 86 to the fixed contact 82. This will isolate the coil 70 from the filament secondary 76 and reconnect the filaments with the secondary winding 76. It will thus be seen that a gradually decreasing magnetic field will have been produced in the shadow mask whereby the shadow mask will have been degaussed.

As a further alternative, the embodiment of FIGURE 4 may be employed. This embodiment is very similar to the embodiment of FIGURE 3. The coil 92 and variable resistance 94 are connected in series with each other and with the filaments and the filament secondary 96. A single-pole, single-throw switch 98 is provided in parallel with the coil 92 and resistance 94. Spring means 100 are provided for normally maintaining the switch 98 closed so as to short circuit the coil 92 and prevent any current flowing therethrough.

When it is desired to degauss the shadow mask, the switch 98 may be momentarily opened. The coil 92 and resistance 94 will then be connected in series with the filaments. This will be effective to prevent a severe overloading of the secondary filament winding 96 in the power transformer and will prevent a complete cooling of the filaments.

When the switch 98 is opened, the resistance 94 will be at a minimum and a maximum current will flow in the coil 92. Spring means 100 are provided to gradually increase the resistance 94 from some predetermined minimum to some predetermined maximum. This will, in turn, gradually reduce the amount of current in the coil 92 and the flux density in the shadow mask to a predetermined minimum whereby the shadow mask will be degaussed. When the current is decreased to a level that will have degaussed the mask, the switch 98 will automatically return to the closed position. The coil 92 will be shorted out and the filaments reconnected with the filament secondary winding 96.

As a further alternative, the embodiment of FIGURE 5 may be employed. This embodiment is similar to the preceding embodiments in that a coil 102 is provided around the picture tube 104 substantially coplanar with the shadow mask. The coil 102 may be substantially identical to the preceding coils. However, a plurality of separate taps are connected to the coil 102 at various points therein.

Each of the taps is interconnected with one of the various fixed contacts 106 in a multi-position switch 108. The switch 108 includes a movable contact 110 which is adapted to swing across the various fixed contacts 106 and successively establish electrical contact with the fixed contacts 106.

Spring means 112 are provided to resiliently bias the movable contact 110 towards an end fixed contact 114 that is not connected to the coil 102. As a consequence, the movable contact 110 will normally be maintained electrically isolated from the coil 102 and no current will flow through the coil 102. One end of the coil 102 and the movable contact 110 are interconnected with a source of alternating current such as a filament winding in the power transformer.

In the event that it is desired to degauss the shadow mask in this tube 104, the movable contact 110 is rotated against the spring 112 so as to engage the end contact 116. This will produce a current through all of the turns in the coil 102. The movable contact 110 is then released whereby the spring 112 will gradually rotate the contact 110 across the successive fixed contacts 106 to the end contact 114. It will thus be seen that the flux produced by the coil 102 will be gradually reduced so that the shadow mask will be degaussed.

As a further alternative, the embodiment of FIGURE 6 may be employed. This embodiment is similar to the preceding embodiments in that it also includes a degaussing coil 120 wound around the exterior of the colored picture tube 122 so as to be substantially coplanar with the shadow mask. The coil 120 is electrically connected in series with the primary winding 124 on the power transformer 126 supplying the power for the TV receiver.

One part 128 of a double-pole switch 130 is electrically connected in parallel with the coil 120. When this switch 130 is closed, the winding or coil 130 will be short circuited and no current will flow therethrough. However, when the switch 130 is opened, the coil 120 will be directly in series with the primary 124 and all of the primary current will flow through the coil 120.

One of the secondary windings 138 on the power transformer 126 is interconnected with the filaments 136 in the various tubes so as to heat the various cathodes. A second part 132 of the double-pole switch 130 is provided in series with this winding 138. When the switch 130 is closed, all of the filaments 136 are energized. However, when the switch 130 opens, it will disconnect all of the filaments 136 from the secondary winding 138.

During normal operation, both portions 128 and 132 of the switch 130 will be closed. All of the filaments 136 will be energized. This will cause the normal current to flow through the primary winding 124, but since the coil 120 will be short circuited by part 128 and no current will flow therethrough.

When it is desired to degauss the shadow mask in the tube 122, both of the switches 128 and 132 are momentarily opened. All of the current in the primary 124 will then flow through the coil 120 and, at the instant the switch 128 is opened, will be a maximum.

As soon as the switch 132 disconnects the filaments 136 from the secondary 138, they will begin to cool. As the filaments 136 and particularly the filament of the power rectifier tube cool, the load in the primary 124 will decrease. This will produce a corresponding decrease in the amount of current flowing through the coil 120. As a result, the magnetic field provided in the mask will gradually decrease so as to degauss the shadow mask.

As a further alternative, the embodiment of FIGURE 7 may be employed. In this embodiment, the television receiver 150 is enclosed in a cabinet 152 having an opening through which the display face 154 of the picture tube is visible. One or more doors 156 and 158 are provided on the television cabinet 152. When the doors 156 and 158 are closed, the various controls and the face 154 of the picture tube will be concealed. However, when the doors 156 and 158 are opened, the display face 154 will be readily visible.

The degaussing system in this embodiment includes a coil 160 mounted on one of the doors 156. This coil 160 is substantially the same size as the preceding coils and is positioned to register with the face 154 when the door 156 is closed. This coil 160 may be operatively interconnected with a suitable source of AC power so as to produce an alternating magnetic flux field.

When the door 156 is closed, the flux field produced by the coil 160 will be of a maximum density in the shadow mask contained within the picture tube. As the door 156 is opened, the coil 160 will be moved away from the display face 154 of the picture tube so that the amount of flux in the shadow mask will be gradually decreased and the shadow mask degaussed.

The current flowing around the degaussing coil produces a flux field that extends through the center of the coil at right angles to the plane of the coil. It has been found that degaussing coils of sufficient diameter to fit around the exterior of colored picture tubes presently available do not produce entirely uniform flux fields throughout all regions of the plane of the coil. More specifically, the flux density at the center of the coil is considerably weaker than near the periphery. As a result, unless large currents are circulated through the coil, the flux density at the center may be so weak that the shadow mask and particularly the center portions are not completely degaussed.

Figure 8:
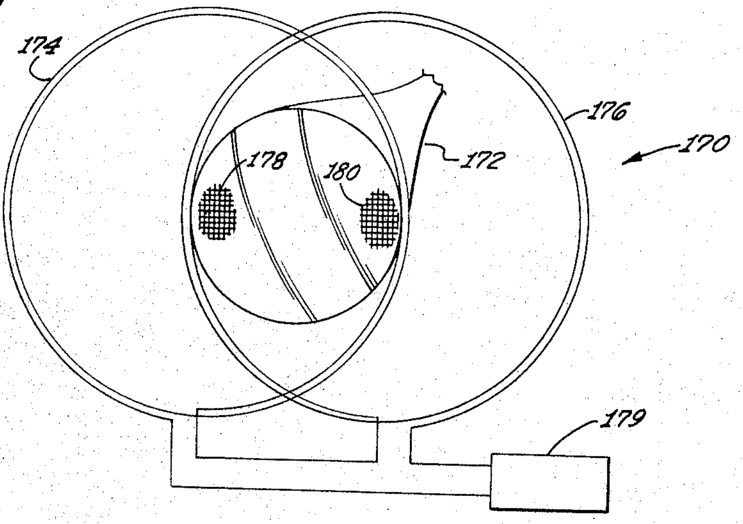
FIGURE 8 is a perspective view of a color television receiver embodying still a further form of the present invention.

To overcome the foregoing difficulties and completely degauss the shadow mask without employing large currents, the embodiments 170 of FIGURE 8 may be employed. In this embodiment, the colored picture tube 172 is substantially identical to the preceding colored picture tube and includes a display face having a plurality of colored phosphors thereon. A shadow mask is provided immediately adjacent to the display face. A plurality of openings are provided in the mask in alignment with the various electron guns and phosphors on the display face for maintaining a complete separation of the colors.

A plurality of degaussing coils are provided to degauss the shadow mask and eliminate any deflection of the electrons from a straight line. Although any desired number of coils may be provided, in the present instance, only two coils 174 and 176 are shown disposed outside of the picture tube 172. The two coils 174 and 176 may be substantially identical to each other and may be positioned somewhat coplanar with the shadow mask in the manner of the preceding embodiments. However, the two coils 174 and 176 are laterally displaced or eccentric with respect to each other. The amount of displacement shown in FIGURE 8 has been greatly exaggerated for purposes of illustration. It will be seen that this will be effective to insure the centers of the two coils 174 and 176 being separated from each other.

The two coils 174 and 176 are electrically connected to a current source 178 for producing a current through the two coils. This current source may be substantially identical to any of the preceding current sources and will therefore produce an alternating pulse having a maximum intensity that gradually decreases to zero.

It may thus be seen that if the region 178 or 180 near the center of the coils 174 or 176 have very little or no flux density, these regions will be displaced from the centers of the other coil and therefore will be disposed in a high flux density region in the field from the other coil. As a result of the two coils 174 and 176 producing overlapping flux fields, the flux density in all regions of the mask will be at a sufficient level to insure a complete degaussing of the entire shadow mask.

Figure 9:
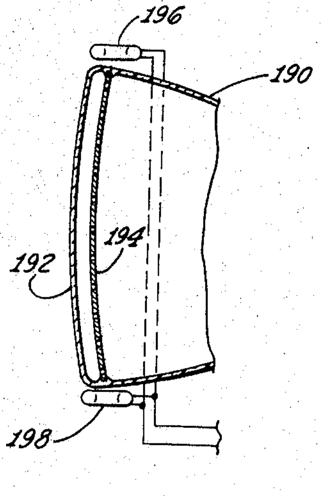
FIGURE 9 is a fragmentary view of a color television receiver embodying a further form of the present invention.
Figure 10:
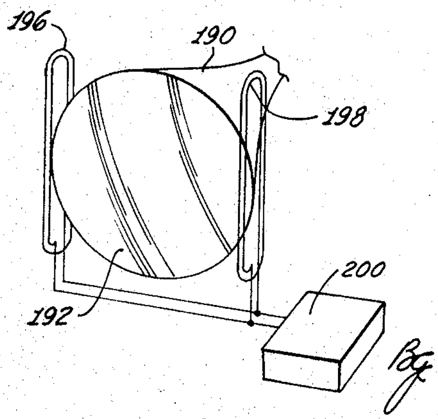
FIGURE 10 is a fragmentary view of a portion of the color television receiver of FIGURE 9.

As an alternative, the embodiment of FIGURES 9 and 10 may be employed. This embodiment employs a colored picture tube 190 substantially identical to the preceding picture tubes. More particularly, the picture tube 190 includes a display face 192 coated with phosphors that luminesce with different colored light. A perforated shadow mask 194 is disposed adjacent the display face. The apertures in the mask 194 are aligned with the different phosphors and the electron guns to maintain a separation of the colors produced by the different electron guns.

In order to degauss the mask, a pair of degaussing coils 196 and 198 are provided adjacent the outside of the tube 190. The two coils 196 and 198 may be substantially identical to each other. Although they may be perfectly circular, in this embodiment they are somewhat elliptical or elongated and are slightly curved to fit adjacent the peripheries of the display face 192 and the shadow mask 194. The two coils 196 and 198 may also be substantially coaxial with each other with the axis extending across the tube in the region of the shadow mask 194.

The two coils 196 and 198 are electrically interconnected with a current source 200 that energizes the two coils 196 and 198 with a degaussing current. This source 200 may be similar to any of the preceding sources and provides a pulse of alternating current that commences with a maximum intensity and gradually decreases to zero.

It will be seen that this current in the two coils 196 and 198 will be effective to produce a pair of alternating flux fields which will tend to overlap each other. As a result of the magnetic permeability of the shadow mask 194, the two coils 196 and 198 will be inductively coupled to each other and a substantial portion of the flux from the two coils 196 and 198 will extend across the shadow mask 194 from one side to the other. As a result, the current source 200 will be effective to produce a magnetic flux field in all regions of the shadow mask 194 whereby the entire shadow mask will be completely degaussed with a minimum amount of power.

The embodiment shown in FIGURE 11 is similar to the embodiments shown in FIGURES 8, 9 and 10 in that it includes two degaussing coils 304 and 302. However, in the embodiment shown in FIGURE 11, the coils are respectively disposed at the opposite ends of the face of a color display tube 304 and in substantially parallel and flush relationship to the face of the tube.

While only a limited number of embodiments of the present invention are disclosed and described herein, it will be readily apparent to persons skilled in the art that numerous changes and modifications may be made without departing from the scope of the invention. Accordingly, the foregoing disclosure and description thereof are for illustrative purposes only and do not in any way limit the invention which is defined only the claims which follow.

What is claimed is:

1. In a color television receiver, a color picture tube having a display face with a plurality of different phosphors distributed across the display face, said phosphors in the plurality being effective to luminesce with visible light of particular colors when bombarded by electrons;

electron means for scanning the display face with electrons to excite the phosphor into luminescing with the particular colors;

a mask disposed in said tube between the face and said electron means, said mask being positioned to shield the different phosphors in the plurality from electrons representing different colors;

at least a pair of coils positioned adjacent the mask at spaced positions and extending in a direction transverse to the mask to produce a magnetic flux field in the mask without any dead spot at any position on the face of the color picture tube, and means coupled to the pair of coils for energizing the coils with a signal of decaying intensity to gradually reduce the intensity of the magnetic flux field in said mask and degauss the color picture tube.

2. In a color television receiver, a color picture tube having a display face;

groups of phosphors distributed across the face of said tube, the phosphors in each group being effective to luminesce with visible light of a particular color when bombarded by electrons;

electron means effective to scan the display face with electrons and excite preselected phosphors in each group into luminescence in accordance with such scan;

a mask disposed between the display face and electron means, said mask having a plurality of apertures aligned with the electron means and the phosphors in said groups to block preselected electrons from reaching the phosphors in all but one of said groups;

at least a pair of coils mounted adjacent the mask at spaced positions relative to the mask and disposed in a direction transverse to the mask to produce a magnetic flux field in the mask without any dead spot at any position on the display face of the tube, and means operatively coupled to the pair of coils for applying a signal to the coils to gradually reduce the intensity of the magnetic flux field produced by said coils for a degaussing of the face of the color picture tube.

3. In a color television receiver, a color picture tube having a display face;

groups of phosphors distributed across the face of said tube, the phosphors in each group being effective to luminesce with visible light of a particular color when bombarded by electrons;

electron means effective to scan the display face with electrons and excite preselected phosphors in each group into luminescence in accordance with the incidence of such electrons on the phosphors;

a mask disposed between the face and said electron means, said mask having a plurality of apertures aligned with the electron means and the phosphors in said groups to provide for preselected electrons to reach the phosphors in only one of said groups;

at least a pair of coils mounted adjacent the mask in a direction transverse to the mask and disposed in spaced relationship to each other to produce a magnetic flux field extending into the mask without any dead spot at any position on the display face of the tube; and means interconnected with the pair of coils to circulate a decaying alternating current through the coils and produce a decaying magnetic flux field of alternating characteristics through the mask for a degaussing of the display face of the color picture tube.

4. In the color television receiver set forth in claim 3, the last mentioned means including a manually actuatable switch having first and second positions and charging means and a storage condenser connected to the charging means in the first position of the switch to receive a charge from the charging means and connected to the coils in the second position of the switch to discharge through the coils for the production of the decaying current through the coils.

5. In a color television receiver, a color picture tube having a display face with clusters including a separate primary phosphor in each cluster for each primary color;

a plurality of electron guns each being provided for a different one of the primary colors to scan said display face with electron beams, each gun being positioned to direct its beam of electrons onto the phosphor in each cluster having a particular primary color corresponding to the particular gun;

a mask disposed between the face and said electron guns, said mask having a separate aperture for each cluster and positioned in alignment with the electron guns and the respective primary phosphors in the cluster;

a pair of coils disposed in spaced relationship to each other and in transverse relationship to the mask to produce a magnetic flux field;

means mounting said coils adjacent and transverse to the mask and in spaced relationship to each other to direct the flux field through the mask;

current means connected in a circuit with the coils to circulate an alternating current through the coils for provding the magnetic flux field through the mask with alternating characteristics;

resistance means connected in the circuit with the coils for controlling the magnitude of the current through the coils in accordance with the value of its resistance;

actuatable switch means connected in the circuit with the current means and the coils upon the actuation of the switch means; and means coupled to the resistance means and the switch means for providing for a progressive change in the value of the resistance means in a direction to progressively decrease the current through the coils upon the actuation of the switch means.

6. In the color television receiver set forth in claim 5, the color television receiver being disposed within the cabinet and the switch means extending through the cabinet to a position external to the cabinet and having first and second positions and the circuit including capacitance means connected to the current means and the switch means to become charged in the first position of the switch means and connected to the resistance means and the coils in the second position of the switch means to discharge through the resistance means and the switch means.

7. In a color television receiver, a color picture tube having a display face;

clusters of phosphors distributed over the display face of said tube, each cluster including a plurality of separate primary phosphors each being provided for a different primary color;

a plurality of electron guns each being provided for a different primary color to scan said display face with an electron beam and direct a beam of electrons onto the phosphors having the particular primary color corresponding to the particular gun;

a mask disposed between the face and said electron guns, said mask having a plurality of apertures each being provided for an individual one of the clusters, the mask being made from a material having magnetic properties;

at least a pair of coils disposed outside of the tube and substantially normal to the mask and in magnetically coupled relationship to the mask, said coils being disposed on the opposite sides of the mask to produce in the mask flux fields that extend across the mask, and means interconnected with the coils to circulate an alternating current of decaying characteristics through the coils and produce a magneic flux field through the mask of decaying alternating characteristics to degauss the display face of the color picture tube.

8. In the color television receiver set forth in claim 7, the color television receiver being disposed in a cabinet and switch means extending through the cabinet and having first and second positions and means being provided to supply a direct voltage and capacitance means being connected to the voltage means in the first position of the switch means to become charged and the coils being connected to the capacitance means in the second position of the switch means to receive the alternating current of decaying characteristics.

9. In the color television receiver set forth in claim 8, resistance means being connected in the circuit with the capacitance means and the coils and being provided with a movable arm for varying the value of the resistance means in accordance with the movements of the arm and spring means being coupled to the switch means and the movable arm being coupled to the spring means to vary the value of the resistance means in a direction for providing the alternating current with decaying characteristics upon the actuation of the switch means between the first and second positions.

10. In a television receiver mounted in a cabinet, a color picture tube disposed in the cabinet and having a display face for indicating primary colors;

clusters of phosphors distributed over the display face of said tube, each cluster including a separate phosphor for each of the primary colors;

a plurality of electron guns each being provided for a different one of the primary colors, each of said electron guns being effective to scan said display face with an electron beam and direct electrons from the beam onto the phosphors in the clusters having a particular primary color;

a mask disposed between the face and said electron guns, said mask having a separate aperture for each cluster, each of the apertures being positioned in alignment with the electron guns and the respective phosphors in the cluster;

inductance means mounted in a particular relationship to the mask to produce a flux field in the mask;

a storage condenser;

a current source; and switching means having first and second positions and connected in a circuit with the current source and the storage condenser in the first position of the switch to produce a charge in the storage condenser and connected in a circuit with the storage condenser and the inductance means in the second position of the switch to provide for a discharge of the storage condenser through the inductance means in a alternating pattern having decaying characteristics, the switching means being disposed for operation from a position external to the cabinet, the inductance means constituting at least a pair of coils disposed in spaced relationship to each other and in transverse relationship to the mask to provide for a degaussing of the display face without any dead spots.

11. In a color television receiver disposed within a cabinet, a color picture tube having a display face for providing different colors and having electron means for scanning the display face to produce a luminescent colored picture;

a mask positioned adjacent said display face and in alignment with the electron means to maintain a separation of the colors produced by the electron means for controlling the display of colors produced on the display face of the picture tube;

at least one winding disposed adjacent said mask to produce a magnetic flux field in the mask;

a condenser for storing a charge;

switch means having first and second positions and extending through the cabinet to a position external to the cabinet;

means interconnecting with the condenser in the first position of the switch means for charging the condenser to a particular potential; and means interconnecting the winding with the condenser in the second position of the switch means for discharging through the coil the charge stored in the condenser to thereby produce the flux field in the mask and to provide the flux field with an intensity that decays exponentially for degaussing the display face of the tube, at least two windings being disposed adjacent the mask in spaced relationship to each other and in transverse relationship to the display face of the tube and being connected to the condenser in the second position of the switch means for degaussing the display face of the tube without any dead spots on the display face of the tube for such degaussing action.

References Cited

UNITED STATES PATENTS

| | | | |
|---|---|---|---|
| 2,921,226 | 1/1960 | Vasilevskis | 215—8 |
| 2,962,621 | 9/1960 | Fernald | 315—8 |
| 2,962,622 | 9/1960 | Popovich | 315—8 |

OTHER REFERENCES

Scientific Papers of the Bureau of Standards, No. 78, "The Best Methods of Demagnetizing Iron in Magnetic Testing," Burrows, 1907, pp. 213, 214.

RCA publication, The 700 Series, "Color Television Receivers," 1956, pp. 44 and 45.

MILTON O. HIRSHFIELD, *Primary Examiner.*

J. A. SILVERMAN, *Assistant Examiner.*

Notice of Adverse Decision in Interference

In Interference No. 97,944 involving Patent No. 3,340,443, H. F. Rieth and G. O'Leary, COLOR TELEVISION DEGAUSSING APPARATUS, final judgment adverse to the patentees was rendered Jan. 24, 1974, as to claims 1–3, 5 and 7.

[*Official Gazette November 12, 1974.*]